United States Patent
Fryc et al.

[11] Patent Number: 5,439,549
[45] Date of Patent: Aug. 8, 1995

[54] DOUBLE EDGED PRESSURE SENSITIVE FOLDED TAPE APPLICATION APPARATUS

[75] Inventors: Oldrich Fryc, Renton; David J. Layton, Federal Way; Howard A. Storhoff, Seattle, all of Wash.

[73] Assignee: The Boeing Company, Seattle, Wash.

[21] Appl. No.: 175,255

[22] Filed: Dec. 28, 1993

[51] Int. Cl.⁶ .............................................. B32B 31/10
[52] U.S. Cl. .................... 156/461; 156/201; 156/202; 156/464; 156/468
[58] Field of Search ............... 156/461, 465, 468, 200, 156/201, 202, 216, 464; 493/417, 439, 440; 270/41

[56] References Cited

U.S. PATENT DOCUMENTS

| | | | |
|---|---|---|---|
| 4,240,867 | 12/1980 | Diegel | 156/543 |
| 4,322,864 | 4/1982 | Bocca et al. | 156/461 |
| 4,401,503 | 8/1983 | Hertel | 156/461 |
| 4,486,261 | 12/1984 | Koller et al. | 156/202 |
| 4,488,927 | 12/1984 | Hooper | 156/465 X |
| 4,508,584 | 4/1985 | Charles | 156/353 |
| 4,561,929 | 12/1985 | Lenhardt | 156/522 |
| 4,750,966 | 6/1988 | Koller | 156/391 |
| 4,816,109 | 3/1989 | Ingram | 156/443 |
| 4,889,581 | 12/1989 | Ulrich et al. | 156/443 |
| 4,909,870 | 3/1990 | Gould et al. | 156/66 |
| 4,948,454 | 8/1990 | Arnold | 156/443 |
| 4,981,545 | 1/1991 | Shinno et al. | 156/361 |
| 4,995,937 | 2/1991 | Persson | 156/543 |
| 4,997,510 | 3/1991 | Shinno et al. | 156/361 |
| 5,032,211 | 7/1991 | Shinno et al. | 156/361 |
| 5,091,038 | 2/1992 | Greller et al. | 156/465 |
| 5,238,515 | 8/1993 | Insalaco et al. | 156/202 |

FOREIGN PATENT DOCUMENTS 2645796  10/1990  France .................. 493/417

Primary Examiner—Michele K. Yoder
Attorney, Agent, or Firm—Dellett and Walters

[57] ABSTRACT

An apparatus for folding and applying double edged adhesive tape to non resilient objects includes a tape supply spool, a tape tensioning device, a tape backing remover and tape backing take up reels. A folding apparatus folds over portions of top and bottom edges of the tape and pulls the object being taped and the tape along a work surface during the taping operation. An optional "w shape" folder applies an additional pleat to the folded tape.

17 Claims, 6 Drawing Sheets

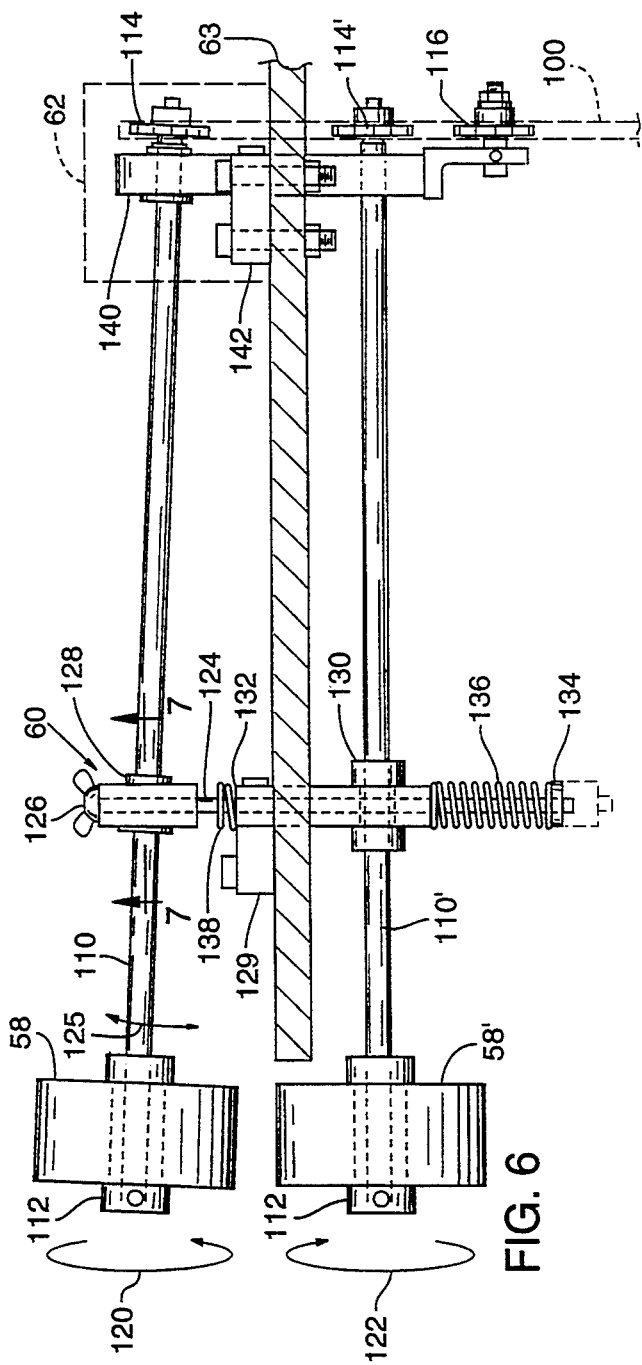
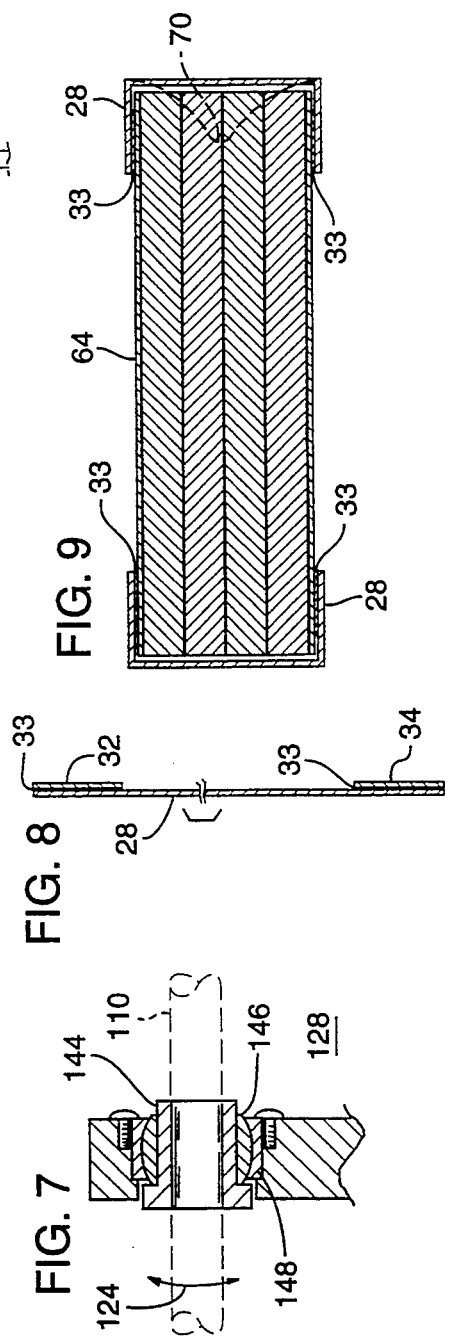

5,439,549

DOUBLE EDGED PRESSURE SENSITIVE FOLDED TAPE APPLICATION APPARATUS

BACKGROUND OF THE INVENTION

This invention pertains to manufacturing processes and more particularly to an apparatus and method for applying double edged pressure sensitive tape to pliable objects.

In manufacturing processes, it is often desirable to apply a sealing membrane to an exposed area for the prevention of moisture or gas penetration. For example, in the manufacture of airplanes, insulation blankets are typically supplied with vapor/moisture barrier facings; however, the edges of the insulation blankets are unfaced and exposed. Such exposure can lead to wicking of moisture into the insulation blanket, particularly in applications where, as in airplane manufacture, the insulation blanket is placed within "non-breathing" areas which do not allow evaporation of built up moisture. The moisture build up can lead to a reduction in the insulation factor of such an insulation blanket and adds weight to the airplane. It is therefore desirable to provide some type of sealing or vapor barrier on the exposed edges of the insulation to enable moisture penetration to be minimized.

Applying such sealing is difficult because in the case of an insulation blanket, the loft of the blanket is desirably maintained, but due to the nature of the blanket, the loft may be easily lost due to compression. Therefore, when applying sealing membranes on edges of the insulation blankets, there has heretofore been a problem in maintaining the insulation loft. Such sealing membranes have taken the form of tapes that have adhesive edges thereon, leading to further application difficulties, since the highly adhesive edges of the tape must be carefully positioned without contacting the insulation blanket (other than at the desired locations), the person applying the tape, or other surfaces (including the tape itself) to avoid undesired sticking. Further, if the tape is not accurately placed on the insulation blanket, or is otherwise misaligned as the tape is further unreeled down an extent of blanket, the misalignment will be increased or will require undesired creasing of the tape leading to exposed points as may enable entry of moisture.

The problems attendant with taping non-rigid members arises in a variety of applications, including airplane manufacture, sleeping bag manufacture, tent manufacture, protective clothing manufacture, and filter manufacture, to name a few.

SUMMARY OF THE INVENTION

In accordance with the preferred embodiment of the present invention, a tape applicator comprises a tape supply reel with take-up reels for receiving removed tape backing material, a tensioning device for maintaining tape tension, an insulation blanket receiving area which receives and drives the insulation blanket therethrough in close relation to the tape and a tape folding apparatus for folding the tape at an appropriate point so as to provide a desired contour for mating with the insulation blanket. A crease member is provided to add a central pleat to the tape for aesthetic appearance. The tape folder comprises upper and lower folding guides in adjustable spaced relation to one another, wherein the adjustment is made to vary the spacing therebetween to accommodate varying sizes of insulation blankets.

It is accordingly an object of the present invention to provide an improved tape applicator for taping non-rigid materials.

It is another object of the present invention to provide an improved adhesive tape applicator that applies tape to insulation without significant compression and loft reduction.

It is a further object of the present invention to provide an improved apparatus for assisting in rapid sealing of insulation blankets against moisture penetration.

It is yet another object of the present invention to provide an improved apparatus for automated application of double edged tape.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 6 is a sectional view taken along line 6—6 of FIG. 5 illustrating the puller mechanism;

FIG. 7 is a sectional view taken along line 7—7 of FIG. 6 illustrating further detail of the feeder rod bushing;

FIG. 8 is a sectional view of a typical double edged tape employed with the apparatus of the present invention; and FIG. 9 is a sectional view of an insulation blanket with double edged tape applied thereto in accordance with the present invention.

DETAILED DESCRIPTION

Figure 1:
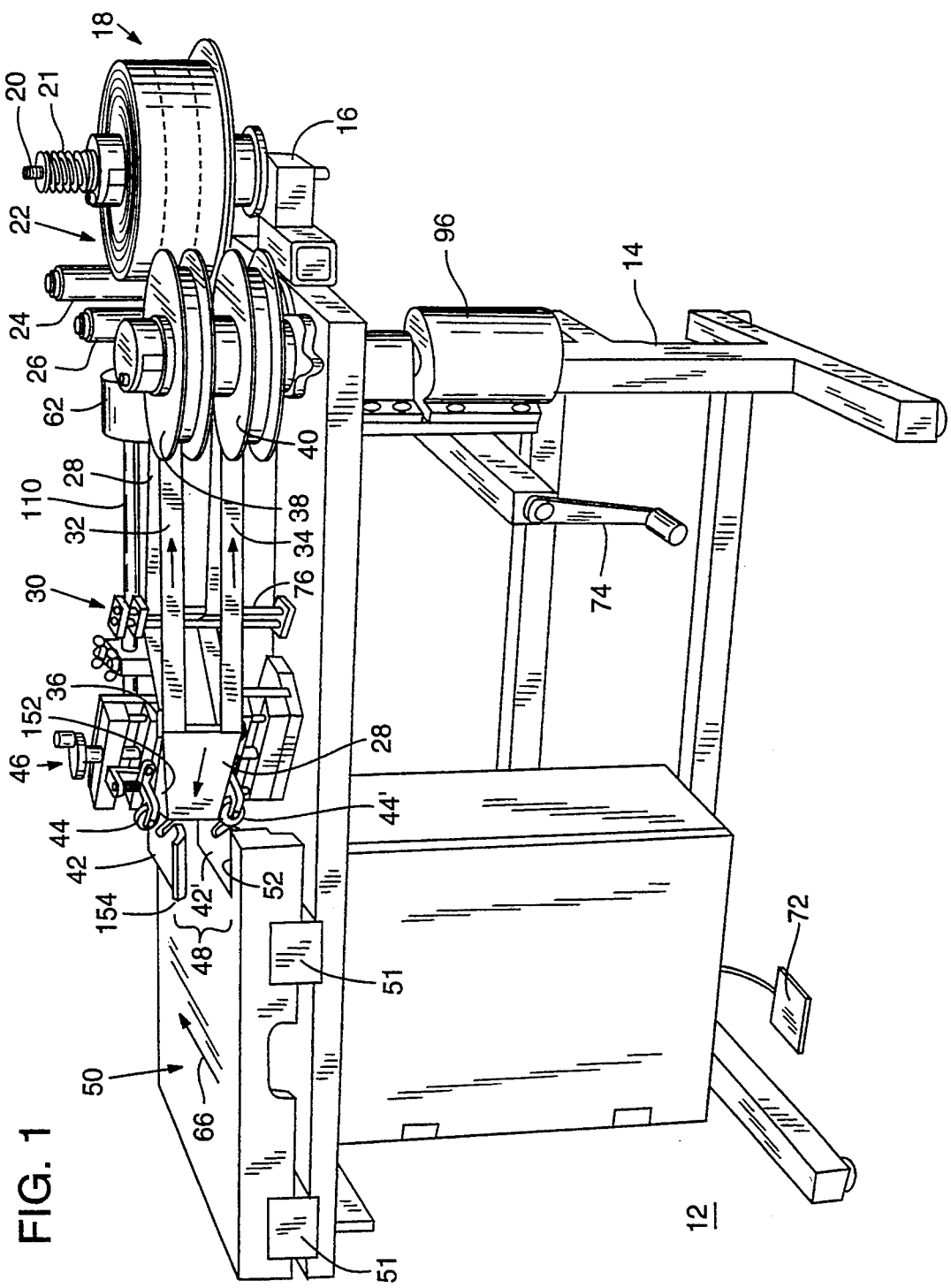
FIG. 1 is a perspective view of a double edged tape applicator.
Figure 5:
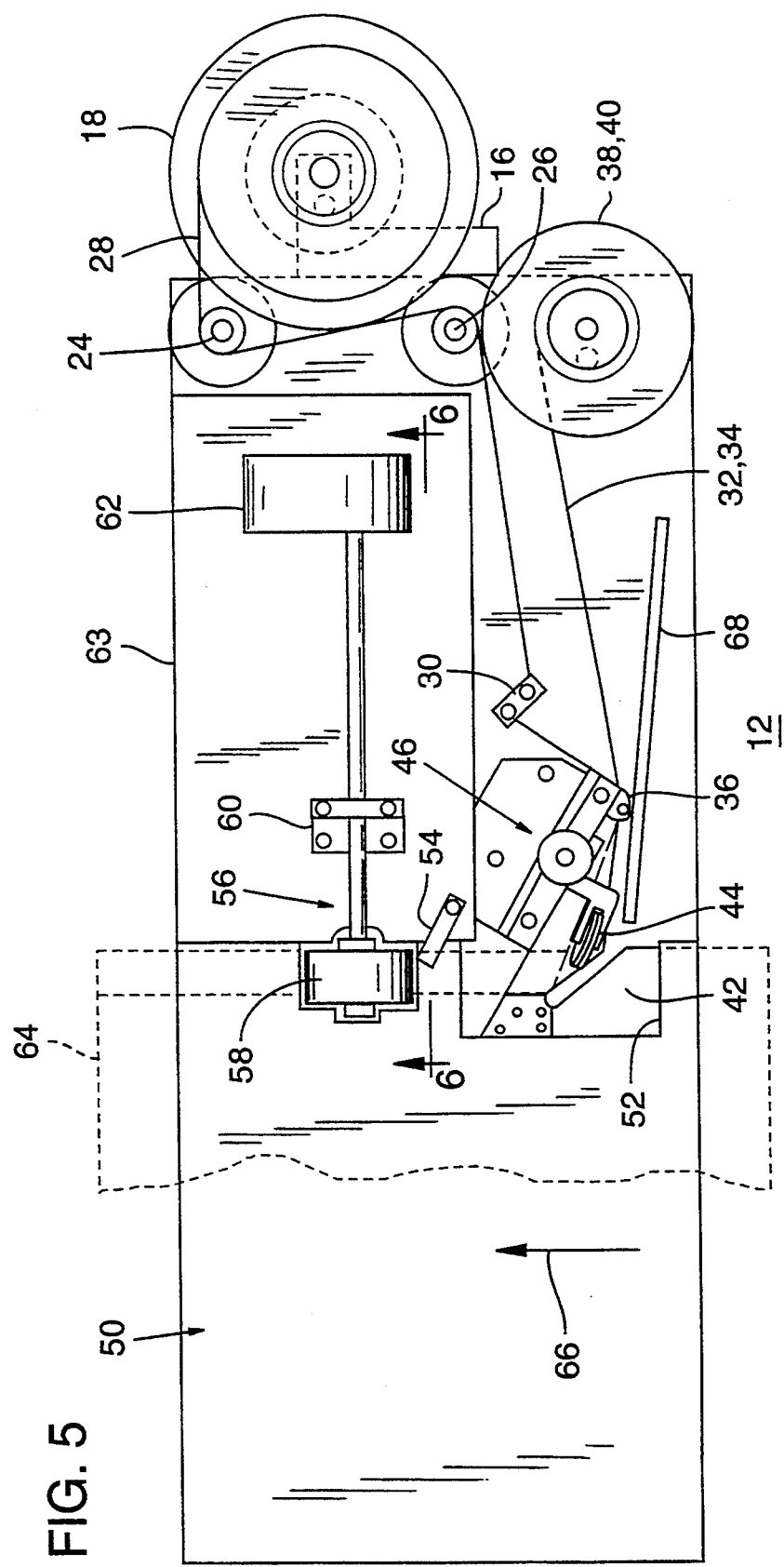
FIG. 5 is a plan view of the tape applicator illustrating an insulation blanket in phantom.

Referring to the figures and in particular to FIG. 1, a perspective view of a double edged tape application apparatus 12 in accordance with the present invention and FIG. 5, a plan view of the tape applicator, the apparatus includes a supporting table 14 which holds the various components that comprise the apparatus. A tape spool stand 16 mounts to one side of table 14 and holds tape spool 18 in a rotational engagement, enabling the tape spool to rotate about spool stand axle 20 for the purposes of unreeling the tape spool. The tape spool carries tape 28 which may, depending upon the particular application, include first and second backing papers 32 and 34 that cover the adhesive portions of the tape to prevent sticking between layers of tape on the roll. The construction of the tape 28 and its backing papers 32 and 34 is illustrated in greater detail in FIG. 8, a sectional view of a typical double edged tape employed with the apparatus of the present invention. The adhesive areas 33 on one side of the tape are protected by the backing papers, to prevent unintentional sticking.

Figure 3:
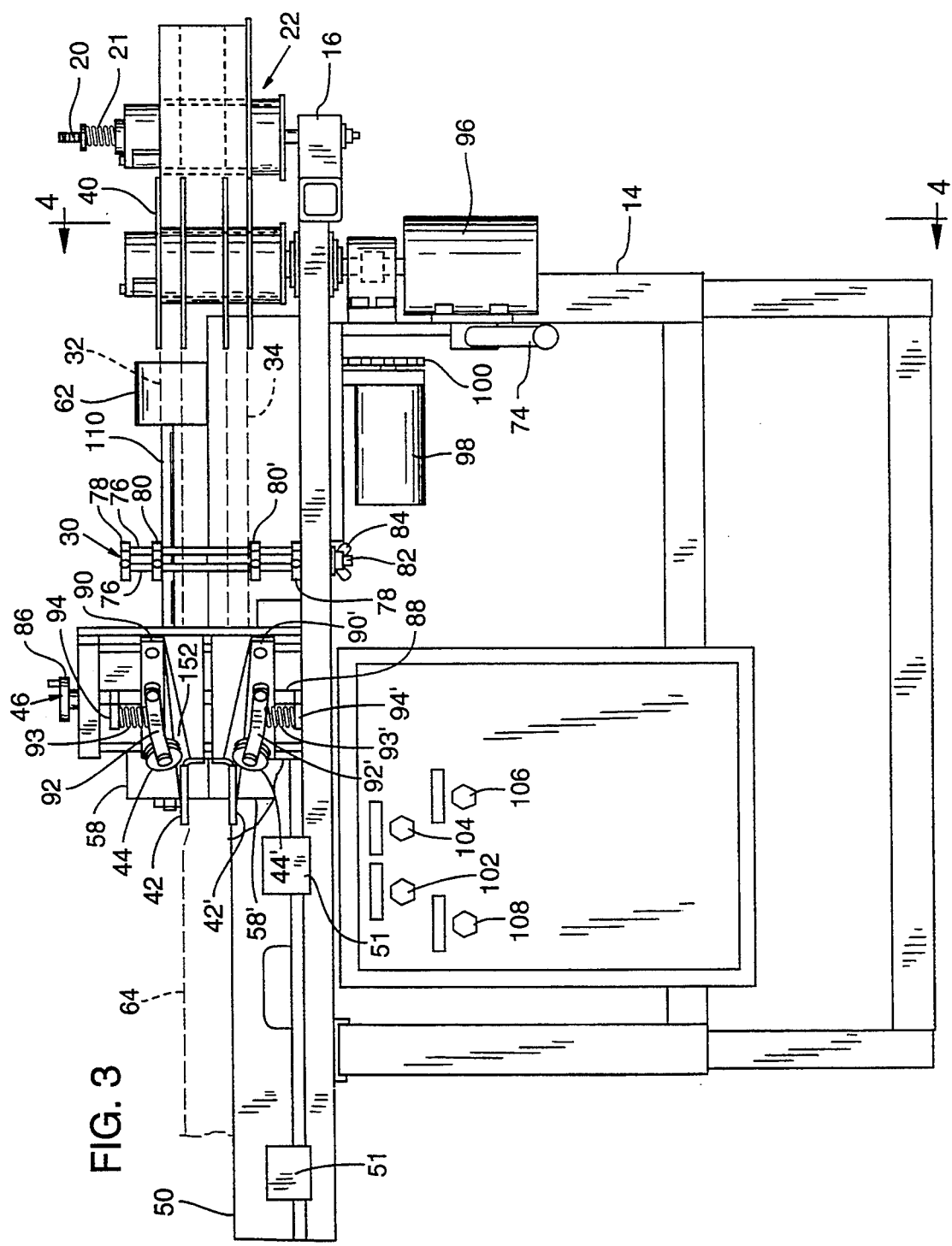
FIG. 3 is a front view of the tape applicator.

An adjustable spring clutch 21, visible in FIG. 3, is in frictional engagement with the tape spool to prevent the spool from freely spinning to ensure that the tape remains taut during feeding thereof. First and second guide rollers 24 and 26 are positioned on table 14 and define the travel path of tape 28 as it unrolls from spool 18. A tape tensioning device 30 receives the tape from second guide 26. After passing through the tensioning device, the tape is received by backing paper release roller 36 which separates the backing papers from the tape. The now separated backing papers 32 and 34 are supplied to backing paper take-up spools 38 and 40.

Tape 28, separated from the backing paper, passes through upper and lower tape folders 42 and 42', with upper and lower folder wheels 44 and 44' assisting in guiding the tape through the folders. Tape folders 42 and 42' are flared upwardly and downwardly respectively at the leading edges 154 thereof, visible in FIG. 1, and the configuration of an individual tape folder is described hereinbelow in connection with FIG. 2. A tape folder width adjustment mechanism 46 enables the distance 48 between upper and lower tape folders 42 and 42' to be varied, in order to accommodate articles to be taped in different thicknesses. The tape folders 42 and 42' are positioned adjacent the inner edge (relative to table 14) of work surface 50, and extend somewhat into a rectangular cut out region of the work surface. Work surface 50 is suitably in the form of a flat rectangular table portion positioned to one side of table 14, held in spaced relation above table 14 by two height blocks 51 removably placed between table 14 and work surface 50 to the left and right of the center of the work surface.

Figure 4:
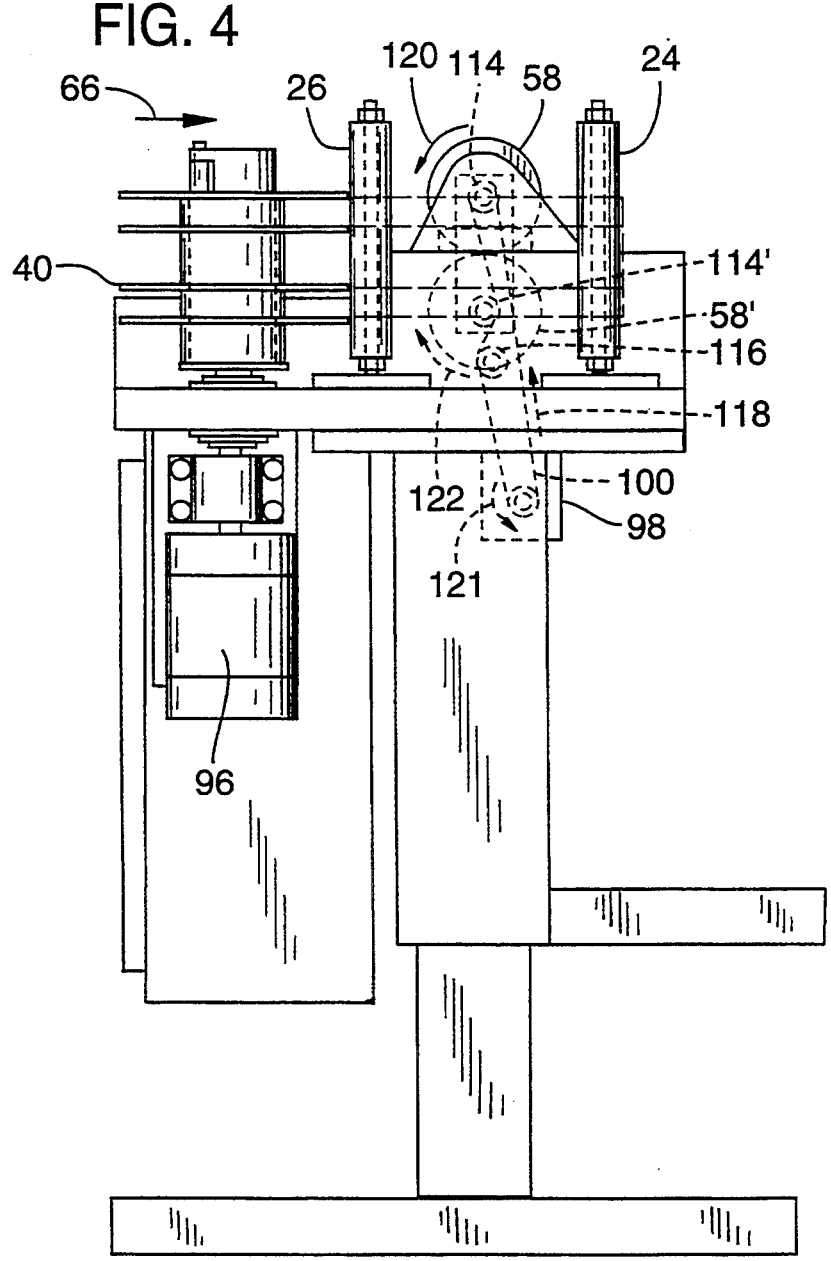
FIG. 4 is a side view of the tape applicator taken along line 4—4 of FIG. 3.

A "w shape" tape folder 54, visible in FIG. 5, is provided in the form of a finger like extension mounted to support table 14 near the central inner edge of work surface 50, and is adapted to extend pivotally into and out of a space above the work surface inner edge. Located rearwardly from the placement of folder 54 is puller mechanism 56, which comprises top roller wheel 58 (FIGS. 3, 4, 5 and 6) and bottom roller wheel 58' (FIGS. 3, 4 and 6). Top roller wheel 58 is spring loaded by support mechanism 60 and both rollers 58 and 58' are rotationally powered by drive mechanism 62. Support mechanism 60 and drive mechanism 62 suitably rest atop a table assembly 63. The spring loading of roller 58 and the driving relation between the rollers and drive mechanism 62 are described in conjunction with FIG. 6 hereinbelow. A protective shield 68, shown only in FIG. 5, is removably placed at the front of the apparatus and extends substantially across an area along the front face of the apparatus defined between take-up spools 38 and 40, paper release roller 36 and upper and lower folder wheels 44 and 44', for the purpose of preventing an operator of the machine and the insulation blanket 64 from contacting the adhesive tape prior to the folding thereof. Foot pedal 72, as seen in FIG. 1, is actuable by an operator to control operation of the tape applicator as discussed hereinbelow. Also visible in FIG. 1 is an adjustment crank 74, which allows adjustment of the height of table 14 to maintain a consistent work surface height relative to other equipment in the work area while accommodating different widths of articles to be taped.

Referring more particularly to FIG. 3, a front view of the tape applicator according to the present invention, certain aspects of the applicator will be described in greater detail. Tape tensioning device 30 comprises two vertically oriented rods 76, maintained in spaced relation to each other by upper and lower bars 78. Upper and lower adjustable ledges 80 and 80' are frictionally engaged with both rods 76, and may be loosened (by operation of wing nuts, not shown) to enable upward or downward movement of the ledges along rods 76 to position the ledges adjacent the top and bottom edges respectively of tape 28. The lower bar 78 mounts on a central pivot rod 82 extending downwardly through an aperture in the work table wherein a wing nut 84 is in threaded engagement with the pivot rod, enabling the tensioning device to be fixed against rotation about the pivot rod by tightening of the wing nut.

Tape folder width adjustment mechanism 46 comprises an adjustment crank 86 mounted on the top of a vertically oriented threaded rod 88 adapted to rotate around the longitudinal (vertical) axis thereof when crank 86 is operated. Rod 88 is in threaded engagement with upper and lower folder mechanism carriages 90 and 90', such that rotation of crank 86 and rod 88 in a clockwise direction causes upper carriage 90 to travel upwardly and lower carriage to travel downwardly, thereby increasing the distance 48 between the two carriages. Conversely, rotation of crank 86 in a counterclockwise direction causes the two carriages to move closer together. The tape folders 42 and 42' are mounted to the upper and lower carriages respectively as are upper and lower folder wheels 44 and 44', so that movement of the carriages upwardly or downwardly causes corresponding upward or downward movement of the folders and folder wheels. The folder wheels are rotationally mounted to support arms 92 and 92', these being pivotally held at ends distal from the wheels to carriages 90 and 90'. Biasing members 93 and 93', suitably comprising springs, engage wheel support arms 92 and 92' respectively and urge the arms and the attached wheels downwardly in the case of arm 92 and upwardly in the case of arm 92', away from spring retainers 94 and 94', thereby maintaining the wheels in firm engagement with tape 28 as it passes through the folding mechanism.

Also shown in FIG. 3 is take up spool drive motor 96 which is positioned beneath the take up spool 40 in direct drive relation thereto. Puller motor 98 powers the top and bottom puller wheels by driving chain 100, as discussed hereinbelow in conjunction with FIG. 6.

Operator controls are mounted on a panel beneath work surface 50 and comprise take up motor control 102 for turning the take up motor on and off, puller motor control 104 operative to apply power to puller motor 98, emergency stop 106 which halts all movement of the apparatus when actuated and power switch 108 for supplying and removing power to the tape applicator.

Referring now to FIG. 6 in particular, comprising a sectional view taken along line 6—6 in FIG. 5 and illustrating the puller mechanism support, top and bottom rollers 58 and 58' are mounted via bushings 112 at first ends of upper and lower drive shafts 110 and 110'. At the ends of the drive shafts distal from the rollers, upper and lower drive sprockets 114 and 114' attach to the drive shafts and are engaged by drive chain 100 to transfer power from puller motor 98 to the rollers. An idler sprocket 116 is positioned below lower sprocket 114' and assists in guiding drive chain 100 in a manner that enables the top and bottom rollers to rotate in opposing directions. FIG. 4, a side view of the tape applicator taken along line 4—4 of FIG. 3, illustrates the placement of sprockets 114, 114' and idler sprocket 116 in relation to puller motor 98 and drive chain 100. In FIG. 4, when puller motor 98 is driven in the direction of arrow 121 (counterclockwise), chain 100 travels in the direction of arrow 118 and top sprocket 114 and idler sprocket 116 rotate in the direction of arrow 120 (counterclockwise in this view), while lower sprocket 114' rotates clockwise. The two rollers thereby rotate so as to pull the insulation blanket across the work surface and by the tape folder mechanism in the direction of arrow 66. Rotational direction arrows 120 and 122 may also be observed in FIG. 6.

Referring to FIG. 6, upper drive shaft 110 is adjustable upwardly and downwardly in the direction of arrow 125 to allow varying of the spacing between the upper and lower roller wheels and to allow variation of pressure between the wheels as necessary to provide sufficient friction to pull the tape through during threading when the insulation is not present as well as to pull the tape and insulation through together. This spacing adjustment is accomplished via loading apparatus support 60, the latter comprising vertically oriented pin 124 carrying thumb screw 126 at the upper end thereof. Pin 124 engages upper drive shaft 110 by means of shaft support 128, the structure and operation of which is described in conjunction with FIG. 7 hereinbelow. Pin 124 passes through a shaft support assembly 132 which is mounted to table assembly 63 by base 129. Shaft support assembly 132 extends downwardly through an aperture in table assembly 63 and fixes lower shaft support 130 at a position so as to enable the lower shaft support to receive lower drive shaft 110' therethrough in a rotational relation. Pin 124 extends downwardly a substantial distance beyond the bottom of shaft support 132, and is threaded at the lower portion thereof to enable threaded engagement with threaded base bar 134. Spring member 136 receives and surrounds pin 124 and provides spring pressure between base bar 134 and the lower end of shaft support assembly 132, urging pin 124 downwardly and consequently providing a downward bias for upper drive shaft 110 and roller 58. As a result of the threaded engagement of pin 124 and threaded base bar 134 and the positioning of spring 136, the compression of the spring is adjustable by rotation of thumb screw 126. An upper spring 138 rests between shaft support 128 and base 129, to prevent hard engagement between support 128 and base 129.

Drive support 140 is secured to table assembly 63 by base 142 near sprocket 114 and receives upper drive shaft 110 therethrough in rotational and pivotal relation such that motion of drive chain 100 powers rotation of upper drive shaft 110, while still enabling upward and downward pivotal motion of the drive shaft along arrow 125. The structure and operation of drive shaft support 140 corresponds to that of shaft support 128.

Referring now to FIG. 7, a sectional view taken along line 7—7 of FIG. 6 illustrating further detail of the shaft support 128 (and 140), a central sleeve 144 receives the drive shaft therethrough and is surrounded by a spherical plane bearing 146 supported in bearing housing 148. Bearing 146 enables rotational movement about the longitudinal axis of the drive shaft while also allowing pivotal movement of the longitudinal plane of the drive shaft. The upward and downward adjustment of the upper drive shaft and roller wheels is thereby permitted, while still enabling the drive chain 100 to transfer rotational movement via sprocket 114.

Figure 2:
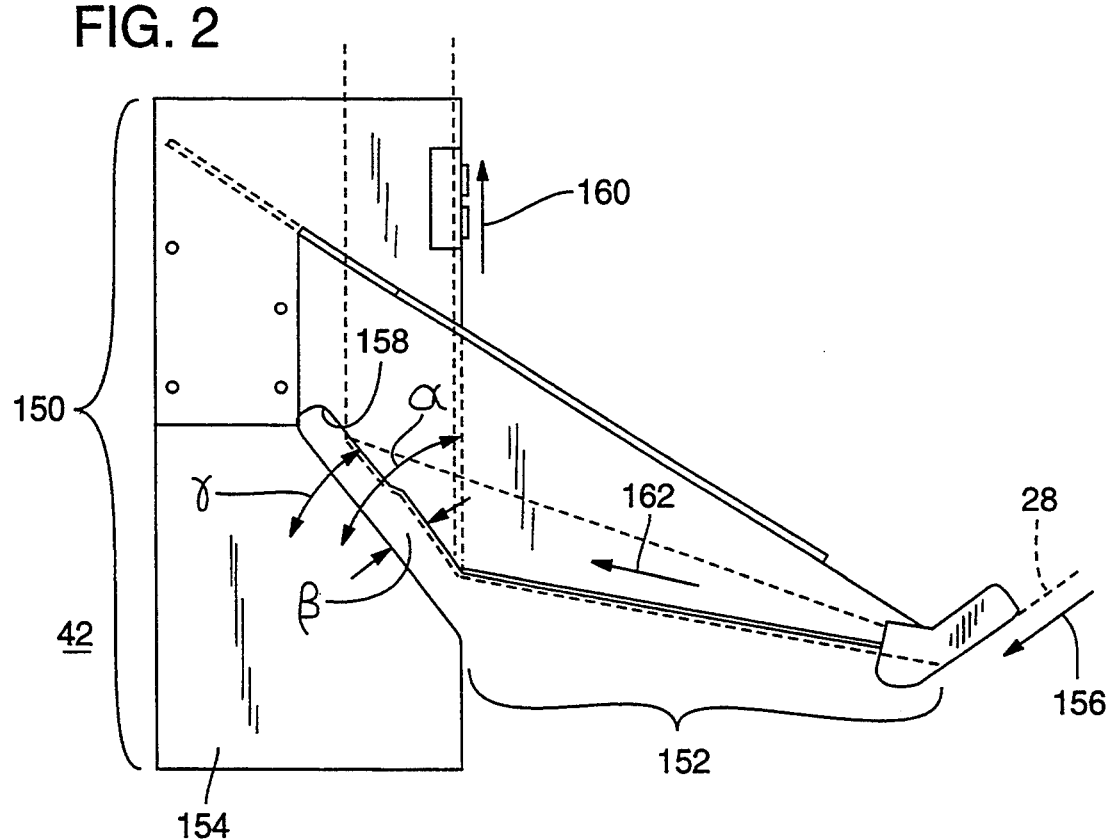
FIG. 2 is a plan view of one of the tape folders.

Referring particularly to FIG. 2 which is a plan view of upper tape folder 42, as well as FIGS. 1 and 3, the folder comprises a substantially horizontal portion 150, and an upwardly inclined portion 152 (also seen in FIG. 3) that extends up at an angle to the right of the horizontal portion when viewed from the front. Folder 42 is provided with an upwardly extending leading edge 154 (FIG. 1) which helps to compress the insulation blanket slightly as it is fed into the taping apparatus. Tape 28 is supplied in the direction of arrow 156, initially with a substantially vertical orientation, and travels across portion 152, which as a result of its angled configuration, causes a portion of the tape at the edge thereof to bend away from the vertical, while the central portion of the tape retains a vertical orientation. The tape continues across portion 152 and is fed into folding slot 158 whereupon the tape turns at an angle $\alpha$, suitably eighty-two degrees, relative to the tape's infeed travel line 162 along the front edge of portion 152. After making the turn, the tape continues traveling in the direction of arrow 160, i.e., parallel to the insulation blanket feed direction 66 (FIG. 1), but now underneath the top surface of the folder. An edge portion of the tape is thereby folded over to a horizontal orientation, while the central portion thereof remains vertically aligned, providing a folded edge flap on the tape at approximately a ninety degree angle to the central portion of the tape.

The folding slot 158 comprises a diagonally oriented throat in portion 150 that extends from a position approximately one fourth of the length of portion 150 from leading edge 154 to approximately the center of portion 150. The throat is slightly wider at its mouth end than at its closed end. In a preferred embodiment, the opening at the mouth end forms an angle $\beta$ to the infeed line 162, such angle suitably being forty-five degrees. The closed end portion of the throat is at an angle $\gamma$ to the infeed line 162, wherein this angle is preferably forty degrees. The forty-five degree angle is advantageous in providing a satisfactory folding action without excessive bunching of the tape at the folder throat.

Lower tape folder 42' is vertically aligned with upper folder 42, comprising a mirror image of the upper folder, and folds the opposite edge of the tape from a vertical to horizontal configuration. The folded over portions of the tape are typically the portions carrying adhesive 33, so that once the tape is folded, the adhesive portions are in spaced facing relation to one another, whereby when fed in conjunction with the insulation blanket, the blanket is taped as illustrated in FIG. 9.

In operation, an article to be taped, for example an insulation blanket 64 illustrated in phantom in FIG. 5, is drawn along work surface 50 in the direction of arrow 66 by the rotational action of rollers 58 and 58'. The space between top and bottom tape folders 42 and 52 is adjusted by operation of tape folder width adjustment mechanism 46 to accommodate the thickness of the insulation blanket 64 or other article to be taped.

To accomplish the taping in accordance with the invention, protective front shield 68 is removed to allow easy access by an operator to the various components of the apparatus for tape threading. Power is applied to the machine by operation of power switch 108 (FIG. 3). If the particular tape being applied has backing paper, then both take up motor 96 and puller motor 98 are powered up via operation of controls 102 and 104. When tape without backing paper is used, only puller motor 104 need be activated. A height adjustment shim is then placed on tape spool stand 16 to provide the proper height adjustment of the tape spool when mounted thereon. The tape spool is then positioned on the stand and secured to the spool stand axle 20 by any suitable means. A length of tape 28 is unreeled from the spool and threaded around guide rollers 24 and 26 and through tensioning device 30. However, if the tape used does not employ backing paper, then the tape need not be threaded through the tensioning device. Next, the tape is threaded between paper release roller 36 and the surfaces of the tape folder 42, and if the tape has backing thereon, a length of the backing sufficient to enable threading of the take up spools is removed, suitably eighteen inches, and the ends of the backing are inserted into the take up spools. The tension on the backing is then manually adjusted by turning the take up spools until the desired tautness is obtained.

The end of tape 28, now positioned near the folders 42 and 42′, is then folded to adhere the two adhesive edges to each other, and the tape is pulled around and through the throat openings in the tape folders. The tape is pulled in the direction of arrow 66 along the edge of the work surface and roller 58 is lifted to allow the tape to pass underneath the top roller wheel and over the top of bottom roller wheel 58′.

At this point in the set up operation, the operator should check to determine that the tape is properly threaded through the folders and any adjustments in the height of the tape spool 18 and the tensioning device 30 should now be made, wherein clockwise rotation of the tensioning device as viewed from above increases tension on the tape. Once the check is complete and any necessary adjustments have been made, protective shield 68 is replaced at the front of the apparatus. If the "w shape" tape folder is to be used, then it should now be rotated to extend into the path of the tape and the article to be taped. While use of the "w shape" folder is optional, when using tapes having widths of four inches or greater, the "w shape" folder is desirably employed to give a neater, pleated appearance to the taped article.

The insulation blanket or other article being taped is now placed on the work surface and positioned between the tape folders. The puller mechanism and take up reels are now actuated, by operation of foot pedal 72, to begin feeding of the tape and article 64, while the operator guides the article to maintain the article close to the inside surfaces of the folders. The article being taped is frictionally engaged by the rollers 58 and 58′ and the rotational action of the rollers pulls the article and tape along work surface 50 in the direction of arrow 66. The two rollers also serve to press the adhesive portion of the tape against the article to ensure an adequate seal. A first edge of the article is taped by running the article through the tape applicator, and if a second edge is to be taped as illustrated in FIG. 9, then the article is rotated 180 degrees to present the untaped edge for taping.

The operation regarding changing the tape roll for a different sized tape (e.g. a wider or narrower tape) comprises first adjusting the tape spool height, which involves removing the previously installed tape spool and height adjustment shim followed by installing an appropriate new height adjustment shim and the new roll of tape. Next, the adjustable ledges 80 and 80′ of the tensioning device 30 are realigned by loosening the tighteners holding the ledges in place, moving the ledges upwardly or downwardly along the tensioner rods to position the ledges adjacent the points where the upper and lower edges of the new size tape will pass through the tensioner, and retightening the ledges in their new positions. The tape folder width is now adjusted by rotation of the knob on the top of the folder width adjustment mechanism 46, clockwise to widen and counterclockwise to narrow the distance 48 between upper and lower tape folders 42 and 42′. New height blocks 51 are now suitably inserted beneath work surface 50 to position the work surface flush with lower tape folder 42′. Finally, the height of the table 14 is adjusted by rotation of crank 74 to appropriately adjust the height of work surface 50 relative to other equipment in the work area. The threading procedure previously described may then be followed to thread the new tape, whereupon the taping process may begin with the new tape width.

The result of use of the tape applicator in accordance with the present invention may be observed in FIG. 9, a sectional view of an insulation blanket 64 with double edged tape 28 applied thereto. Tape 28 has been applied to left and right sides of the insulation blanket, and is held in place by pressure sensitive adhesive areas 68. The effect of "w shape" tape folder 54 is illustrated in phantom at 70, wherein a pleated appearance is provided to the taped insulation blanket 64.

While the components of the application apparatus suitably contact only non-adhesive portions of tape 28, with some kinds of tape it may be necessary to assist in preventing the adhesive edges of the tape or stray adhesive on the nonadhesive face of the tape from sticking to portions of the application apparatus. Therefore, various components of the apparatus may be suitably coated with a non-stick coating as needed, preferably Plasma Coating #934, distributed by Plasmacoatings of MN Inc., in Bloomington, Minn. For example, the tape tensioner rods 76 and the tape folder components may be suitably coated with the non-stick coating.

A tape application device is thus suitable for applying tape to insulation blanket edges or to other non rigid articles. Edges are sealed with relative ease. Also, while the illustrated tape employed with the apparatus comprises double edged tape with backing paper, other tapes are suitably employed, including, for example, tapes with single backings or no backing and tapes with adhesive on an entire face thereof.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. Apparatus for applying adhesive tape to an object comprising:
   forming means for forming the adhesive tape to a desired cross sectional configuration,
   wherein said forming means comprises a tape folder adapted to fold an edge portion of said adhesive tape thereby forming a crease along the edge and a pressing means for pressing said adhesive tape against the object, wherein said pressing means comprises:
   a substantially horizontal portion for receiving said object in pressing engagement,
   and wherein said tape folder comprises a folding guide, said folding guide comprising:
   an inclined portion, that extends away from the substantially horizontal portion at an angle thereto,
   wherein said horizontal portion and said inclined portion meet at a folding slot defined between said inclined portion and said horizontal portion and wherein said edge portion of the adhesive tape feeds along said inclined portion through said folding slot and underneath said horizontal portion, thereby folding said edge portion of said adhesive tape to an orientation corresponding to the substantially horizontal portion; and feed means for driving said tape and said object to be taped by said tape folder and said compressing means.

2. Apparatus according to claim 1 further comprising supply means for providing the adhesive tape to said forming means.

3. Apparatus according to claim 1 wherein said forming means further comprises:

a second tape folder adapted to fold a second edge of said adhesive tape.

4. Apparatus according to claim 3 wherein said first mentioned tape folder and said second tape folder are in spaced relation to one another and further comprising:

means for varying the distance between said first mentioned tape folder and said second tape folder.

5. Apparatus according to claim 1 wherein the object is readily compressible and wherein said pressing means is provided with an upwardly extending leading edge for receiving and guiding said object underneath said horizontal portion.

6. Apparatus according to claim 3 wherein said second tape folder comprises:

a second substantially horizontal portion for receiving said object in pressing engagement, and wherein said second tape folder comprises a second folding guide, said second folding guide comprising:

a second inclined portion, that extends away from the second substantially horizontal portion at an angle thereto, wherein said second horizontal portion and said second inclined portion meet at a second folding slot defined between said second inclined portion and said second horizontal portion and wherein a second edge portion of the adhesive tape feeds along said second inclined portion through said second folding slot and underneath said second horizontal portion, thereby folding said second edge portion of said adhesive tape to an orientation corresponding to the second substantially horizontal portion of said second folding guide.

7. Apparatus according to claim 1 wherein said folding slot is at an angle to an initial feed direction of the adhesive tape.

8. Apparatus according to claim 7 wherein said folding slot angle is approximately 45 degrees.

9. Apparatus according to claim 6 wherein said first mentioned folding slot and said second folding slot are at a first and second angle to an initial feed direction of the adhesive tape.

10. Apparatus according to claim 9 wherein said first and second folding slot angles are approximately 45 degrees.

11. Apparatus according to claim 1 wherein said folding slot comprises a throat portion having and open end and a closed end and wherein said open end is wider than said closed end.

12. Apparatus according to claim 11 wherein the open end of the throat portion of said folding slot is at a first angle to an initial feed direction of the adhesive tape and said closed end of the throat portion of said folding slot is at a second angle to the initial feed direction of the adhesive tape.

13. Apparatus according to claim 11 wherein said first angle of the throat portion is approximately 45 degrees to the initial feed direction of the adhesive tape and said second angle is approximately 40 degrees to the initial feed direction of the adhesive tape.

14. A tape applicator for applying adhesive tape to the edges of an insulation blanket comprising:

first and second tape folders in spaced relation to one another for folding portions of first and second edges of the adhesive tape, each said first and second tape folders comprising:

a substantially planar pressing portion for receiving the insulation blanket thereagainst with the folded tape edge therebetween and for pressing the folded tape edge against the insulation blanket, an inclined portion, that extends away from the substantially planar portion at an angle thereto, wherein said planar portion and said inclined portion meet at a folding slot defined between said inclined portion and said planar portion and wherein an edge portion of the adhesive tape feeds along said inclined portion through said folding slot and underneath said planar portion, thereby folding said edge portion of said tape to an orientation corresponding to the substantially planar portion of said tape folder.

15. A tape applicator according to claim 14 wherein each of said substantially planar portions of said first and second tape folders is provided with a leading edge portion that extends away from the plane of the substantially planar portion for receiving and guiding the insulation blanket between the substantially planar portions of said first and second tape folders.

16. A tape applicator according to claim 14 wherein said first and second tape folders are spaced relative to each other such that the substantially planar portions thereof are of a distance apart that is slightly less than the thickness of the insulation blanket to be passed therebetween, thereby providing a slight compression to the insulation blanket.

17. A tape applicator according to claim 14 further comprising a tape folder width adjustment mechanism for enabling adjustment of the distance between said first and second tape folders for accommodating different thicknesses of insulation blankets.

* * * * *